(12) United States Patent
Speicher et al.

(10) Patent No.: US 10,299,601 B2
(45) Date of Patent: May 28, 2019

(54) AUTO-ADJUSTING HEADREST FOR AN ERGONOMIC CHAIR

(71) Applicant: SV TOOL CORPORATION, Santa Rosa, CA (US)

(72) Inventors: John M. Speicher, Geyserville, CA (US); Che Voigt, Santa Rosa, CA (US)

(73) Assignee: SV TOOL CORPORATION, Santa Rosa, CA (US)

( * ) Notice: Subject to any disclaimer, the term of this patent is extended or adjusted under 35 U.S.C. 154(b) by 163 days.

(21) Appl. No.: 15/268,451

(22) Filed: Sep. 16, 2016

(65) Prior Publication Data

US 2017/0079438 A1 Mar. 23, 2017

Related U.S. Application Data

(60) Provisional application No. 62/220,156, filed on Sep. 17, 2015.

(51) Int. Cl.
| | |
|---|---|
| *A47C 7/38* | (2006.01) |
| *B60N 2/865* | (2018.01) |
| *B60N 2/809* | (2018.01) |
| *A47C 1/036* | (2006.01) |
| *B60N 2/838* | (2018.01) |

(52) U.S. Cl.
CPC ............... *A47C 7/38* (2013.01); *A47C 1/036* (2013.01); *B60N 2/809* (2018.02); *B60N 2/838* (2018.02); *B60N 2/865* (2018.02)

(58) Field of Classification Search
CPC .......... A47C 7/38; A47C 1/036; B60N 2/809; B60N 2/838; B60N 2/865

USPC .................................. 297/809, 838, 865
See application file for complete search history.

(56) References Cited

U.S. PATENT DOCUMENTS

| | | | | |
|---|---|---|---|---|
| 3,027,194 A | * | 3/1962 | Rumptz ................ | B60N 2/818 |
| | | | | 297/410 |
| 3,608,965 A | * | 9/1971 | Cziptschirsch ........ | B60N 2/818 |
| | | | | 297/410 |
| 4,082,354 A | * | 4/1978 | Renner ................. | B60N 2/829 |
| | | | | 297/410 |
| 4,515,406 A | * | 5/1985 | Fujiyama ............. | A61G 15/125 |
| | | | | 297/391 |
| 4,647,108 A | * | 3/1987 | Hayashi ............... | A61G 15/125 |
| | | | | 248/409 |
| 5,975,637 A | * | 11/1999 | Geuss .................... | B60N 2/002 |
| | | | | 297/391 |
| 6,945,601 B1 | * | 9/2005 | Wu ........................ | A47C 7/40 |
| | | | | 297/284.1 |
| 7,946,653 B2 | * | 5/2011 | Robert .................. | B60N 2/835 |
| | | | | 297/410 |
| 8,939,500 B2 | | 1/2015 | Voigt | |

(Continued)

FOREIGN PATENT DOCUMENTS

JP 01265912 A * 10/1989 ............ B60N 2/829

*Primary Examiner* — Robert Canfield
(74) *Attorney, Agent, or Firm* — Craig M. Stainbrook; Stainbrook & Stainbrook, LLP

(57) ABSTRACT

An ergonomic chair with an auto-adjusting headrest having a base assembly including floor base, a seat bottom, and vertical structure. A seat back frame and back plate are pivotally attached to the base assembly. An arc-shaped guide bar and head rest restraint are slideably disposed on the back plate. such that the back plate slides approximately parallel to the seat back frame. Arc shaped guide bar rotates as the seat back is tilted rearward and forward.

17 Claims, 9 Drawing Sheets

(56) References Cited

U.S. PATENT DOCUMENTS

| | | | | |
|---|---|---|---|---|
| 9,521,908 B1* | 12/2016 | Beck | ............ | A47C 7/38 |
| 2002/0093231 A1* | 7/2002 | Estrada | ............ | B60N 2/829 |
| | | | | 297/216.12 |
| 2003/0141751 A1* | 7/2003 | Stenzel | ............ | A47C 7/38 |
| | | | | 297/410 |
| 2004/0124686 A1* | 7/2004 | Malsch | ............ | B60N 2/888 |
| | | | | 297/410 |
| 2004/0195899 A1* | 10/2004 | Grasse | ............ | A47C 5/12 |
| | | | | 297/452.18 |
| 2005/0225145 A1* | 10/2005 | Furtado | ............ | B60N 2/68 |
| | | | | 297/408 |
| 2011/0101738 A1* | 5/2011 | Jensen | ............ | B60N 2/20 |
| | | | | 297/61 |
| 2014/0292052 A1* | 10/2014 | Parker | ............ | A47C 7/38 |
| | | | | 297/342 |

\* cited by examiner

AUTO-ADJUSTING HEADREST FOR AN ERGONOMIC CHAIR

CROSS REFERENCES TO RELATED APPLICATIONS

The present application claims the benefit of the filing date of U.S. Provisional Patent Application Ser. No. 62/220, 156, filed Sep. 17, 2015 (Sep. 17, 2015), which application is incorporated in its entirety by reference herein.

BACKGROUND

Field of the Invention

The present invention relates most generally to a headrest for a chair, and more particularly to an adjustable headrest for an office chair, and still more particularly to an auto-adjusting headrest that moves harmoniously in coordination with a backrest and/or seat base adjustments in an ergonomic productivity workstation of the kind described in U.S. Pat. No. 8,939,500 (the Voigt '500 patent, incorporated in its entirety by reference herein).

Background Discussion

Reclining chairs used in the office setting generally do not include a headrest, but those that do typically provide a headrest that remains fixed relative to the seat back and to the user. Such a fixed position is rarely comfortable or even useful as the seat back is tilted rearward from a generally upright position. This is because as a seat back is tilted rearward, and thus where the user's torso is moving toward a reclined position, the user's head generally maintains a generally stable position—that is, the head does not tilt back at the same rate as the seat back, at least for a portion of the rearward tilt before reaching a heavily reclined position. Thus, to achieve comfort in partially reclined positions, what is needed is a headrest that is adjustable not only vertically, but fowardly and rearwardly, as well, and preferably in coordination with the seat back rotation and vertical adjustment.

The present invention meets such a need by providing an ergonomic chair having an adjustable headrest, and still more particularly an ergonomic chair having a vertically adjustable headrest pivotally mounted on an arc-shaped bar having a center of rotation that may be set to move in relation to a particular user's head/neck rotation point, wherein a drive apparatus moves the headrest in an arc toward the user's head as the seat back is moved or when the user wishes to adjust the headrest.

SUMMARY OF THE INVENTION

This disclosure presents an improved ergonomic chair with a seat base, a seat back capable of pivotal/rotational movement in relation to the seat base; a headrest assembly slideably mounted on the seat back; an arc-shaped frame and support structure includes slides that are slideably mounted to the headrest assembly so as to permit the headrest to move in a generally arc-shaped motion as the seat back is either tilted rearward from an upright to a generally reclined position or upward from a generally reclined to a generally upright position. The arc-shaped structure has an axis at its center of curvature located approximately through the head/neck rotation point of the user, or the "shoulder axis", as those terms are defined in the U.S. Pat. No. 8,939,500 to Voigt et al, which patent is incorporated in its entirety by reference herein.

In an embodiment, a flexible cable drive moves the headrest in an arc toward the user's head on its slides, and a spring retracts the headrest down and away from the user, also in an arc, as the seat back is moved or when the user wishes to adjust the headrest.

A cam arrangement may be employed to actuate movement of the flexible cable, and the cam arrangement includes a cable with an origin in the backrest assembly, looping over a pulley actuated by a cam, wherein the cam movement is actuated by the seat back as it rotates relative to the seat base. The cable terminates on a spool that can be manually rotated by the chair user to fine tune the headrest position.

Among other things, the ergonomic chair described herein includes an adjustable headrest that a seated user can initially adjust the headrest entirely without reaching behind his head, often an awkward movement.

Further, the headrest assembly has a trajectory between the angle of the arc and the angle of the seat back assembly, wherein as the seat back rotates relative to the seat base, the trajectory is defined by the cam shape. The cam can be thus shaped to provide a wide range of trajectories from a starting point to match the comfort requirements of the user, considering all of the other components of the remainder of the chair, over a wide range of seat back angles.

Still further, the auto-adjusting headrest mechanism described herein offers headrest support well-coordinated with the user's head motion over a wide range of user sizes and head rotation angles.

DETAILED DESCRIPTION

Referring to all of the figures collectively, there is shown generally and in detail an embodiment of a chair assembly having a moveable, auto-adjusting headrest. In the various views, reference numbers not considered in connection with a particular figure under discussion are discussed in companion views wherein the element, structure, feature, or the like will be identified and described.

Figure 1:
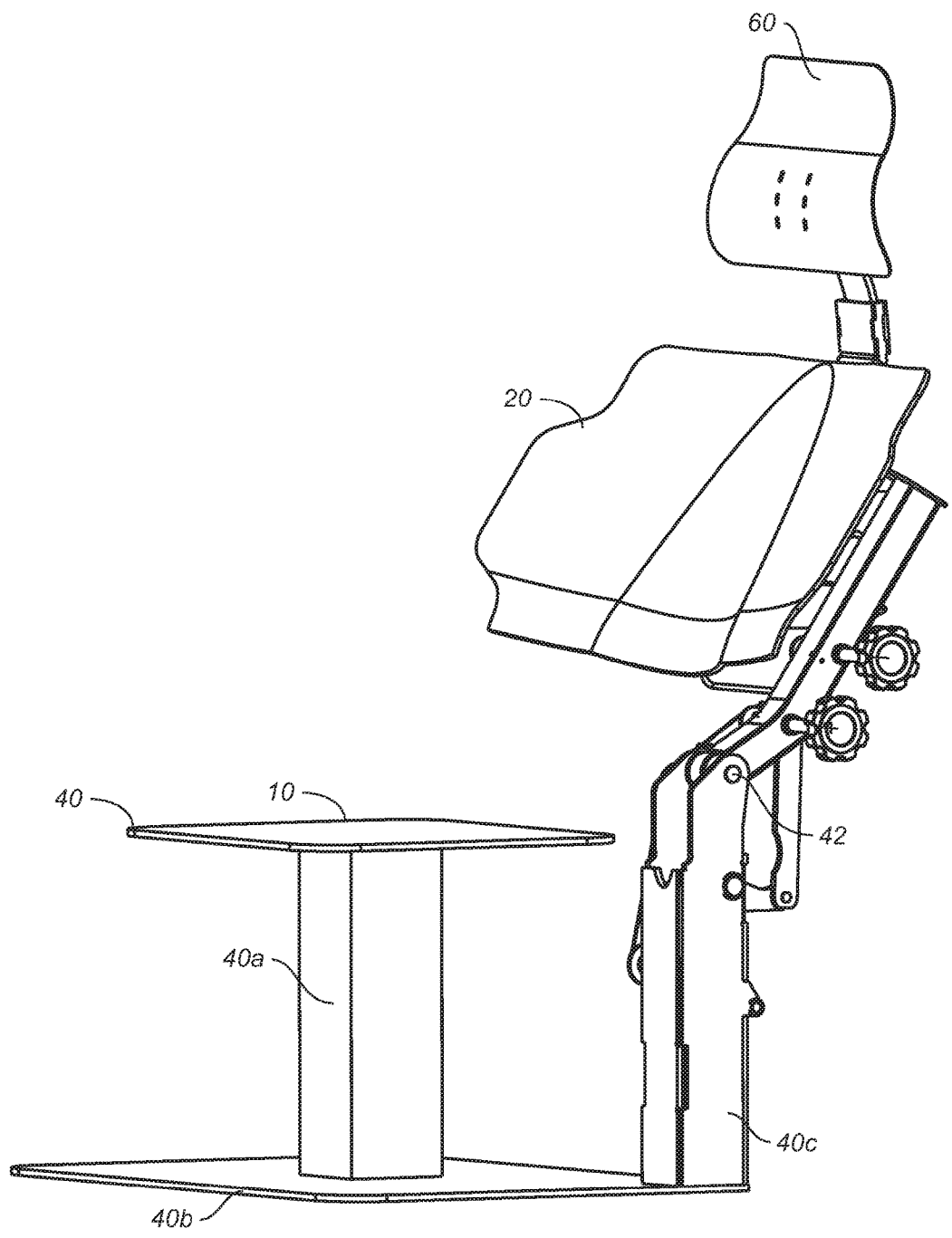
FIG. 1 is a front right perspective view of an embodiment of a chair assembly in which a headrest is incorporated.

Accordingly, and referring first to FIG. 1, there is shown an embodiment of a chair assembly 10 having a seat back assembly 20, a moveable headrest assembly 60, and a seat base assembly 40.

In this embodiment, the seat base assembly 40 includes a floor base 40b, a support pedestal 40a having a seat base disposed atop the pedestal and suitable for a user to sit on, and a vertical post 40c. The seat back assembly 20 is pivotally attached to the seat base assembly 40 at a master pivot 42.

Figure 2:
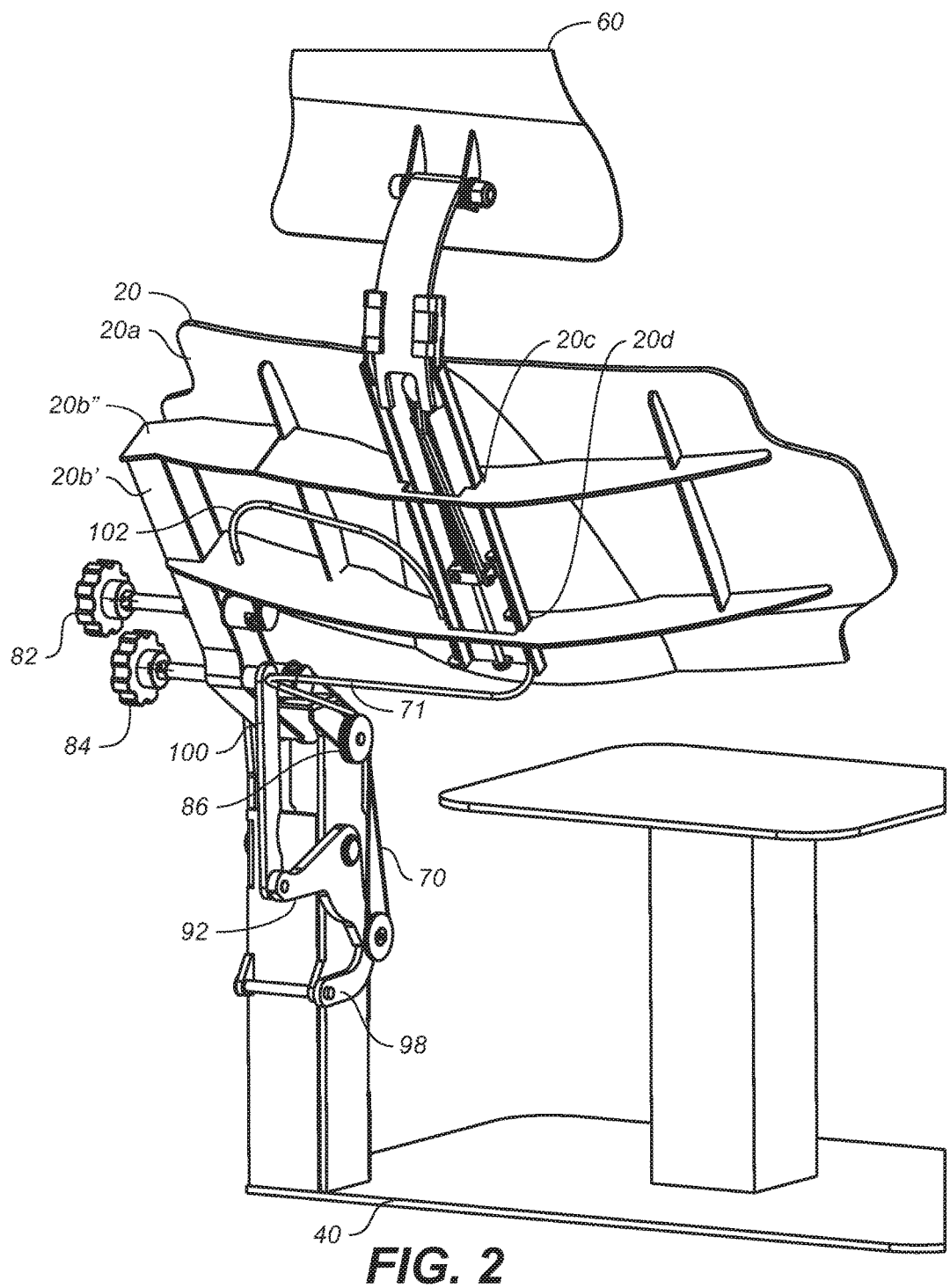
FIG. 2 is a rear perspective in elevation showing detail of an embodiment of a seat back and headrest assembly of the embodiment of FIG. 1.

Referring next to FIG. 2, there is shown the seat back assembly 20 and structures comprising the seat back and headrest movement mechanism. These include a back pan 20a for supporting a user's back and a frame 20b, which in embodiments can comprise a seat back post 20b' pivotally connected to vertical post 40c and a plurality of horizontally and vertically disposed structural ribs 20b". In this embodiment, the frame 20b includes structure for the moveable headrest assembly 60 to slide generally vertically in slide slots, 20c and 20d. The vertical sliding movement sliding allows the vertical position of the headrest to be adjusted manually by the user.

Figure 3:
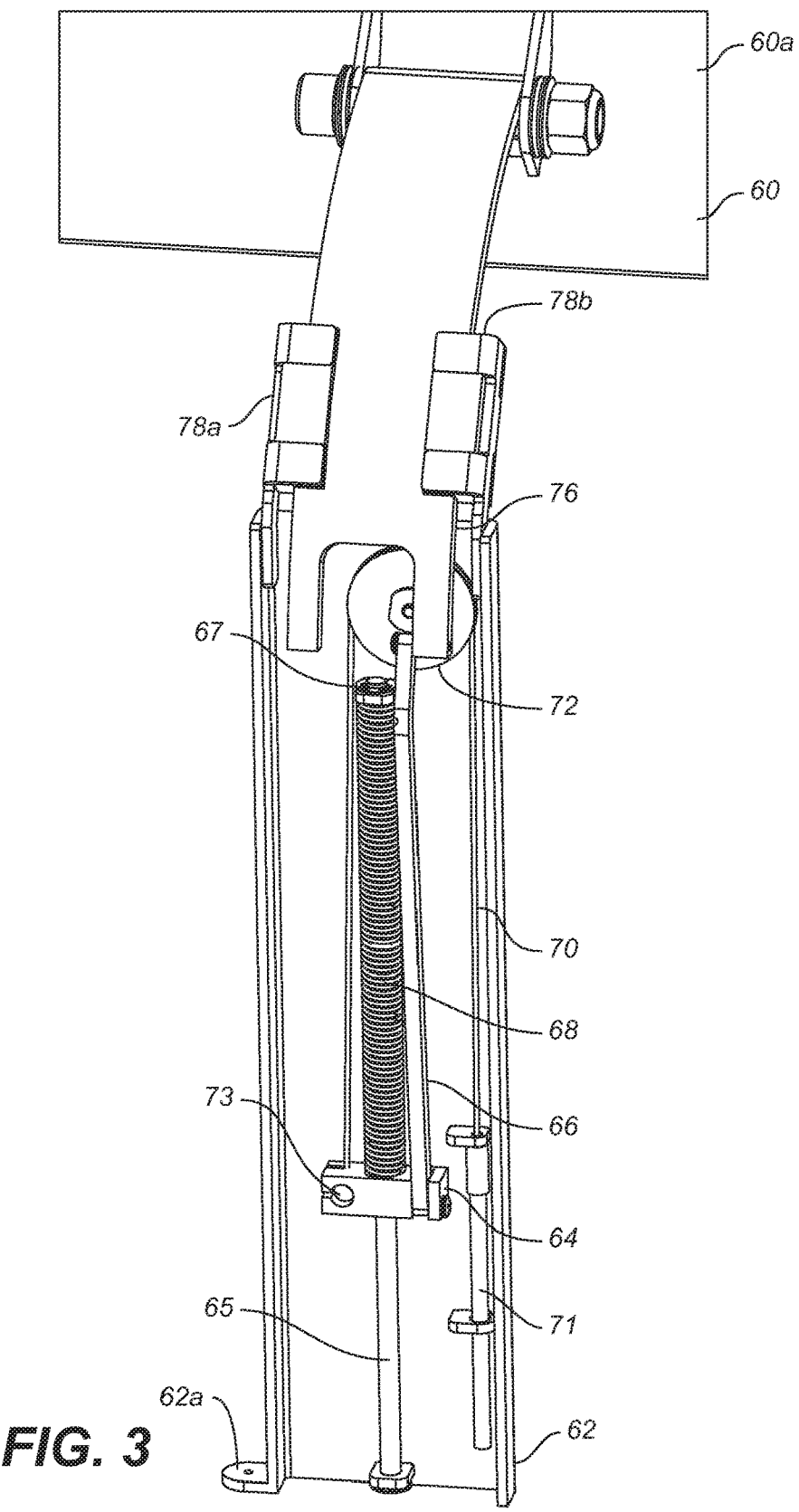
FIG. 3 is a rear perspective view in elevation showing details of the headrest assembly (the seat back on which it is mounted removed for clarity in the view).

FIG. 3 shows an isolated view having details of an embodiment of a moveable auto-adjusting headrest assembly 60 that includes a U-shaped headrest frame 62 (e.g., U-shaped channel) and a slide block 64 slidably disposed over spring post 65 and thereby constrained to slide vertically within the headrest frame 62. A vertical link 66 is pivotally attached at its lower end to the slide block 64 at a pivot point, and at its upper end to a bar, which is an arc structure 76 bending at constant radius forward, i.e., toward the front of the seat back. A helical compression spring 68 disposed over the spring post 65 and under an upper stop 67 urges the slide block 64 downward, along with a flexible headrest drive cable 70 attached at a terminal end 73 to the slide block 64.

The headrest drive cable in this embodiment issues from a cable sheath 71 disposed within the headrest frame proximate its lower end. The flexible headrest drive cable 70 and cable sheath 71 are anchored to the headrest frame 62, and the drive cable 70 loops over the top of the headrest pulley 72 to terminate at a connection 73 on the slide block 64. Tension in the flexible headrest drive cable 70 (with corresponding compression in the cable sheath 71) urges the slide block 64, vertical link 66, and arc-shaped guide bar 76) upward, thus also urging upward the head restraint (or head rest plate) 60a pivotally coupled to the guide bar 76.

The arc-shaped guide bar 76 is constrained to move in an arc about a center near the head/trunk rotation axis, as defined below. This is accomplished through the arc shape of the guide bar which slides through slides, 78a and 78b, which are affixed to the headrest frame 62, each curving forward with a radius matching that of the guide bar.

Figure 4:
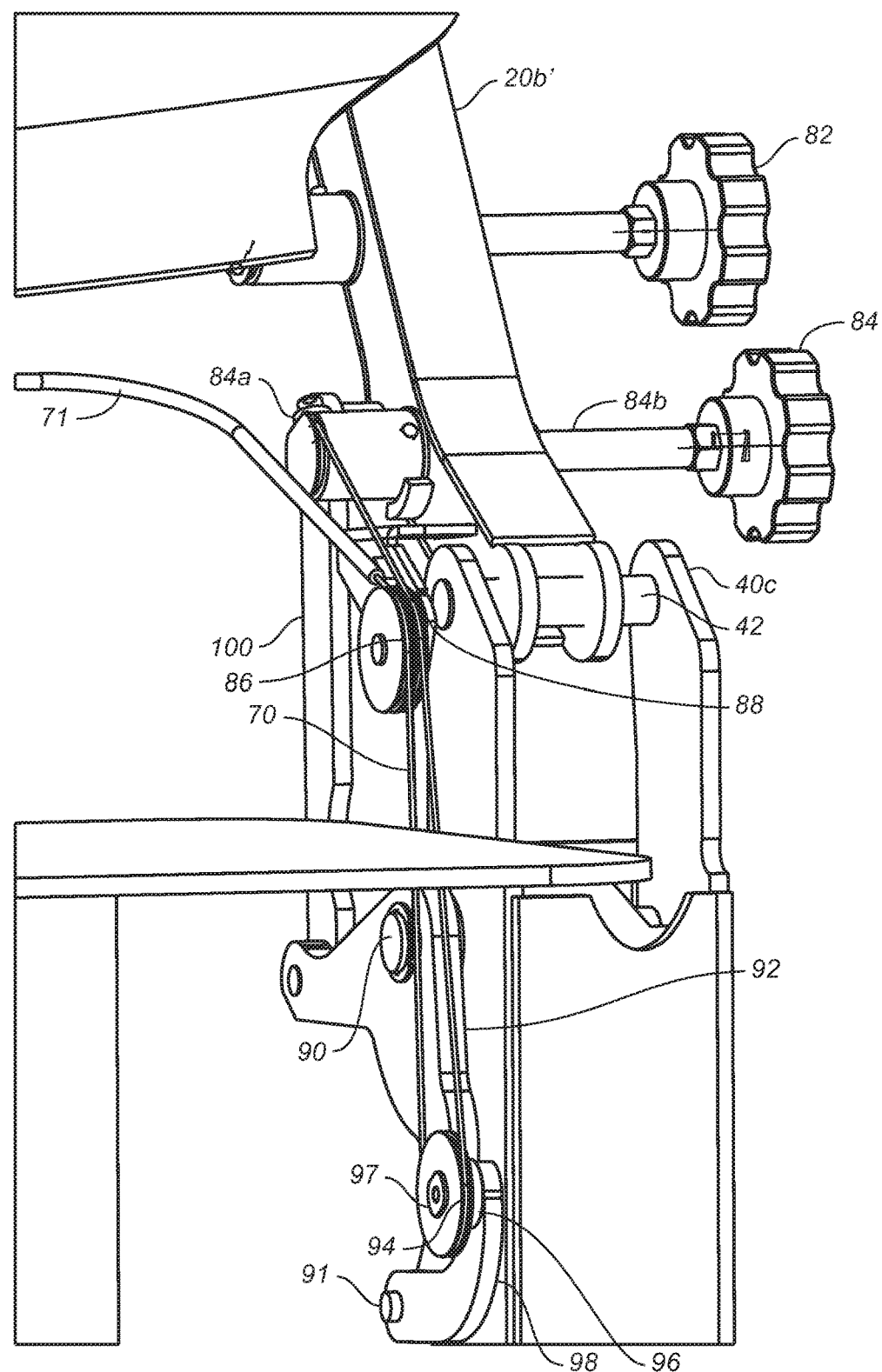
FIG. 4 is a front perspective view in elevation showing details of embodiments of adjustment spindles and manual adjustment spindles through which the user can manually make adjustments to the headrest position, as well as details of the cam drive.

Now referring to FIG. 4, first vertical adjustment spindle 82 and second vertical adjustment spindle 84 are shown pivotally attached to frame 20b in a locations convenient for the user to rotate manually while seated. Axial tension in the spindles, 82 and 84, provides friction to the frame 20b such that a reasonable torque is required to rotate them, yet at a force easily manageable by the ordinary user. Frame 20b is pivotally attached to vertical post 40c at the master pivot 42.

A first pulley 86 and a third pulley 88 are pivotally attached to frame 20b and positioned slightly above the seat base assembly 40. Drive cable 70 extends from the cable clamp 84a, which is disposed on the inboard end of second vertical adjustment spindle shaft 84b, and loops over the third pulley 88, thereafter continuing downwardly around a second pulley 94 mounted on the cam follower arm 98, where it is then routed upwardly and over the first pulley 86 to feed into the cable sheath 71.

Cam 92 is also pivotally attached to the vertical post 40c at a cam pivot 90. Cam follower arm 98 is pivotally attached to the vertical post 40c at a lower pivot point 91. Then second pulley 94 and cam follower roller 96 are pivotally attached to the upper end of cam follower arm 98 at an upper pivot point 97.

Figure 5:
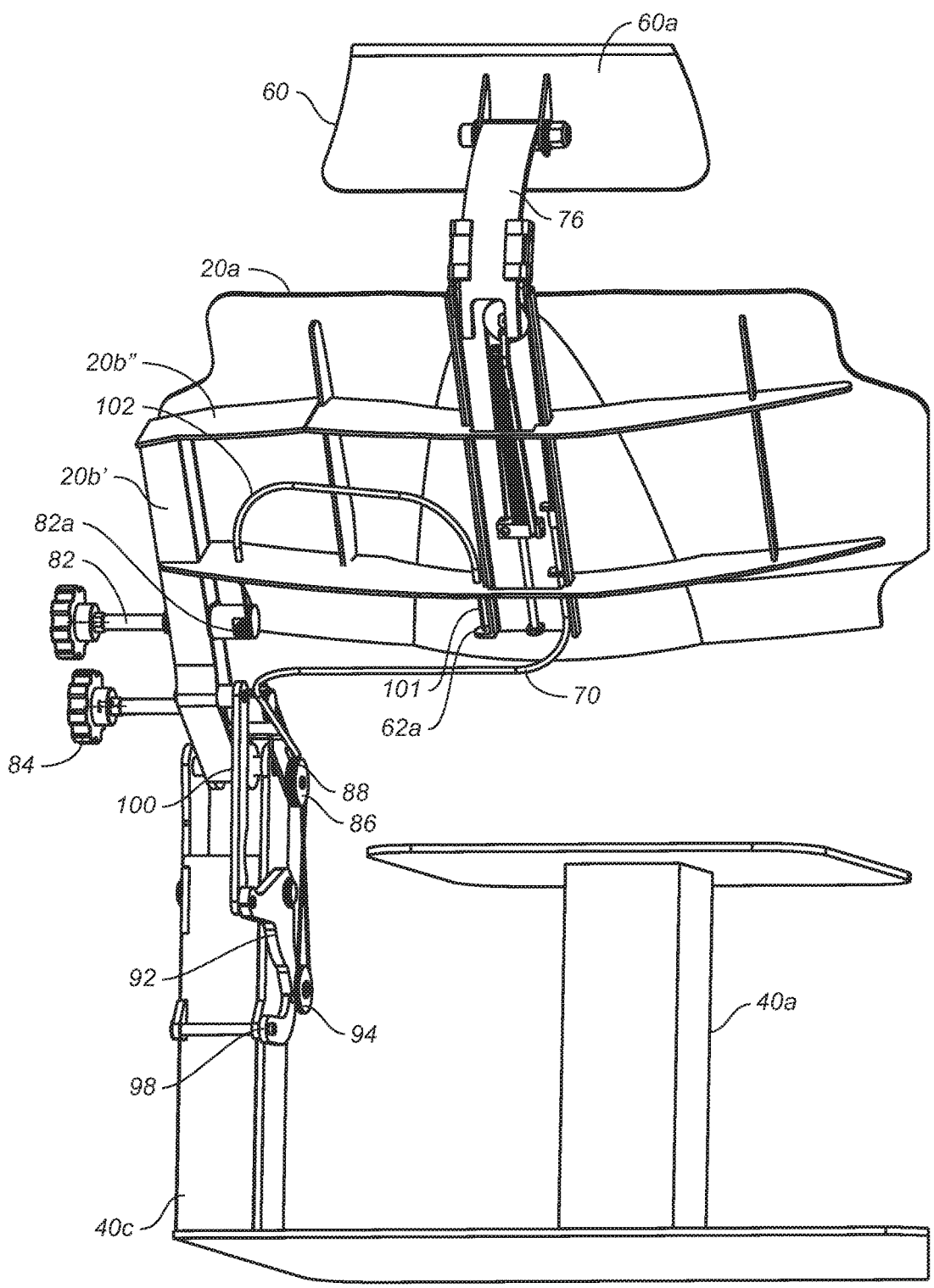
FIG. 5 is a lower rear perspective view showing details of a seat back mounting and adjustment structure as well as headrest assembly, manual adjustment structures, and cam drive.
Figure 6:
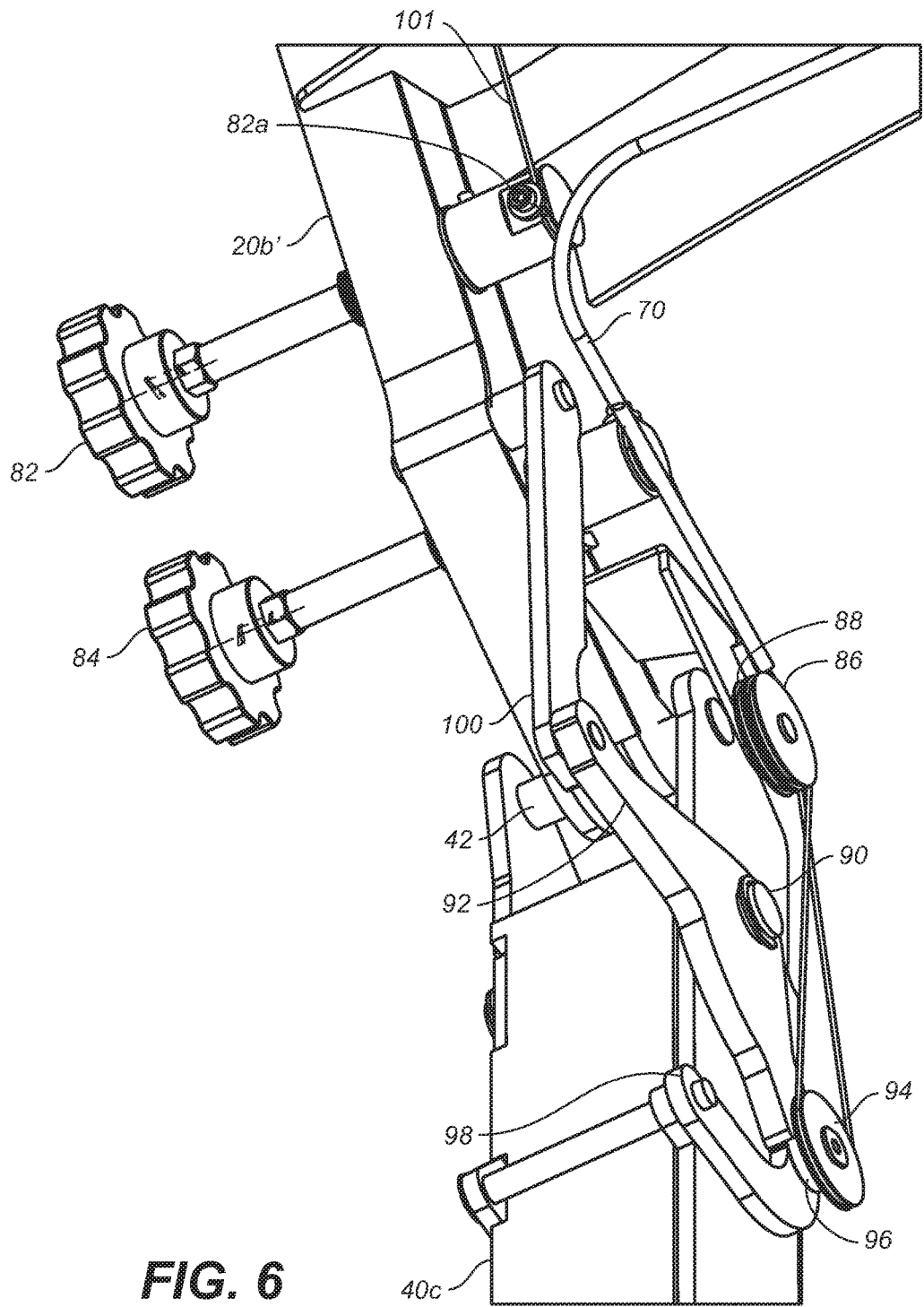
FIG. 6 is a lower rear perspective view showing details of spindle and cam elements employed in a headrest assembly.

Turning next to FIGS. 5-6, a vertical drive cable 101 originates at first vertical adjustment spindle cable clamp 82a, principally routed through cable sheath 102, and the sheathed cable is looped up, over, and down to terminate at headrest frame cable mount 62a.

A cam drive link 100 is pivotally attached at its lower end to the cam 92 and at its upper end to the frame 20b. The flexible headrest drive cable 70 and cable sheath 71 are routed from the headrest assembly 60 toward the third pulley 88.

Figure 7:
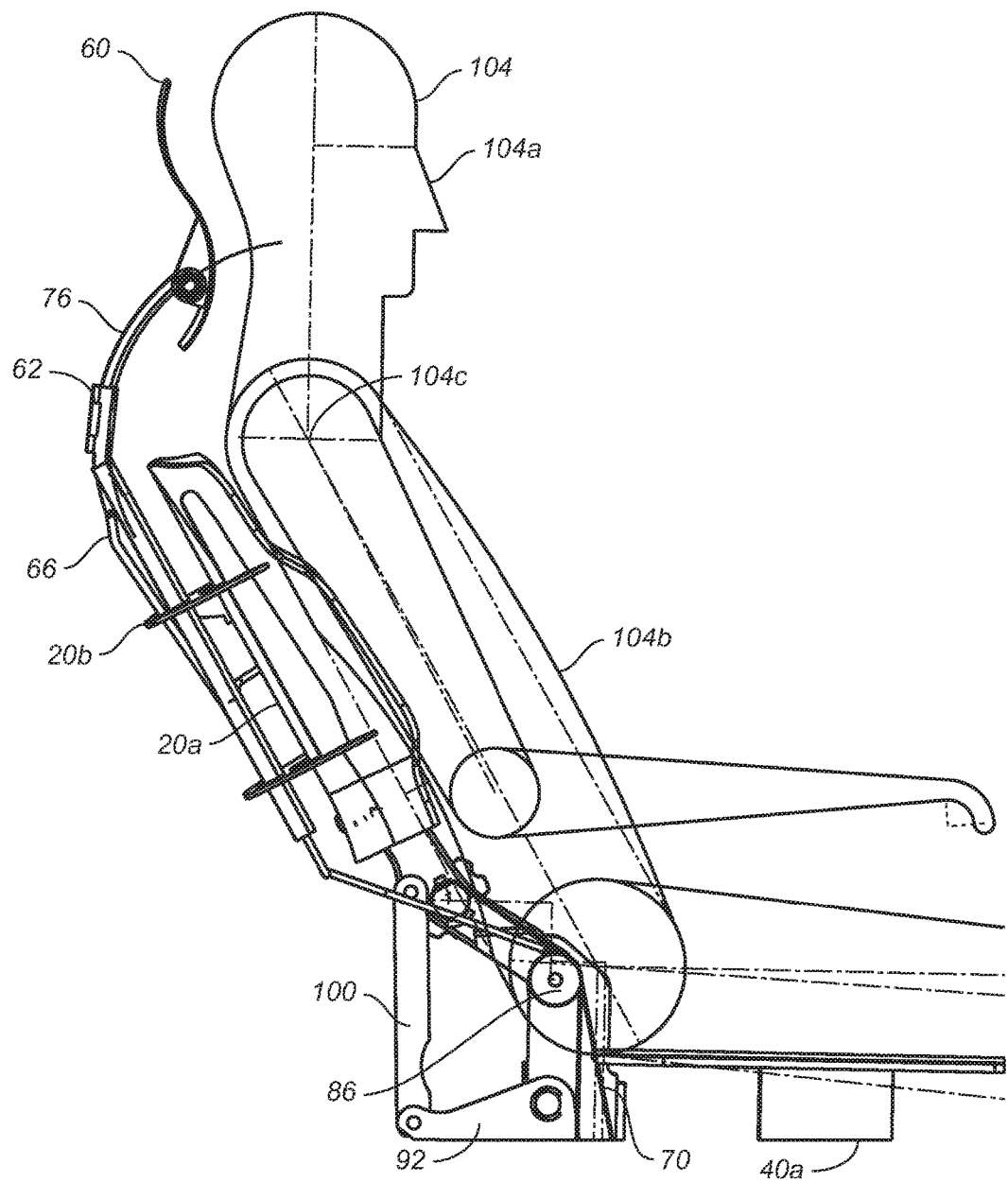
FIG. 7 is side view in elevation showing a user seated on the chair incorporating a headrest assembly.

FIG. 7 depicts a user 104 in silhouette as he might be positioned by chair cushions (not shown) on the chair. In this embodiment, when the user tilts his head 104a forward and back in the plane of the figure around the trunk 104b, the motion can be closely approximated as the head 104a rotating about a head/trunk rotation axis 104c located approximately through the centers of the humeral heads laterally and perpendicular to the plane of the figure, as illustrated. In this embodiment, the arc-shaped guide bar 76 is located such that the center of curvature is closely aligned with the head/trunk rotation axis 104c. This allows smooth coordinated rotation between the user's head and the arc over a wide angle of rotation.

Looking again at FIG. 5, a user sitting on the pedestal 40a can rotate the vertical adjustment spindle 84 with his left hand, thereby releasing or increasing tension in the vertical drive cable 70. Increased tension in the vertical drive cable urges the headrest assembly 60 upward. If tension is released, the headrest will slide downward under its own weight (see FIG. 7). Note that as the user adjusts the headrest position to match his or her height, the rotation axis of the arc-shaped guide bar 76 stays aligned with the head/trunk rotation axis 104c over a wide range of user sizes. In other words, a radius having the head/trunk rotation axis as a center will describe an arc that traces the arc of the guide bar 76 as seen in profile [FIG. 7].

In this embodiment, the user can also rotate the vertical adjustment spindle 84 to relieve or increase tension in flexible headrest cable 70 and cable sheath 71. [FIG. 3] Increased tension urges the slide block 60 and the vertical link 66 upward. The vertical link urges the arc-shaped guide bar 76 to move upwardly, thereby moving the user's head forward. If tension is released, the process reverses as the extension spring 68 urges the slide block 64 downward, and the head restraint 60a backward.

Once a user has adjusted the nominal vertical and horizontal positions of the headrest a described above, if the user then rotates the seat back (including the seat back frame 20b), the cam drive link 100 rotates cam 92 in the direction of the frame 20b rotation. As the cam 92 rotates, cam follower roller 96 is urged downward by the cam 92 or upward by tension in the flexible drive cable 70. Variable tension in the flexible drive cable and sheath will rotate the guide bar 76 and thus support the user's head throughout the seat back's range of motion and in all of the different positions, as dictated by the seat back assembly 20 angle and the cam 92 shape.

The motion of the headrest of the present technology has a trajectory between the angle of the arc-shaped guide bar 76 and the seat back assembly 20, such that as the seat back rotates relative to the seat base, the trajectory is defined by the cam shape. The cam can be thus shaped to provide a wide range of trajectories from a starting point to match the comfort requirements of the user, considering all of the other components of the remainder of the chair, over a wide range of seat back angles.

The initial adjustment spool allows the user to set the arc-shaped guide bar 76 start point. However, the start point does not significantly affect the trajectory from that start point as the seat back rotates. This allows different users to be accommodated comfortably without a need to change the cam shape.

Further, as the headrest pulls back toward the seat as the seat back is rotated, it will by nature generate a pinch point between the headrest and the seat back. The maximum pinch force generated in this pinch area is limited by the spring force, normally only about 5 lb., thereby contributing to the safety of the technology disclosed herein.

As the headrest is extended toward the user by the cable tension, the headrest and cable can support high forces without damage while at the same time not exerting high retraction forces that could be dangerous.

Figure 8:
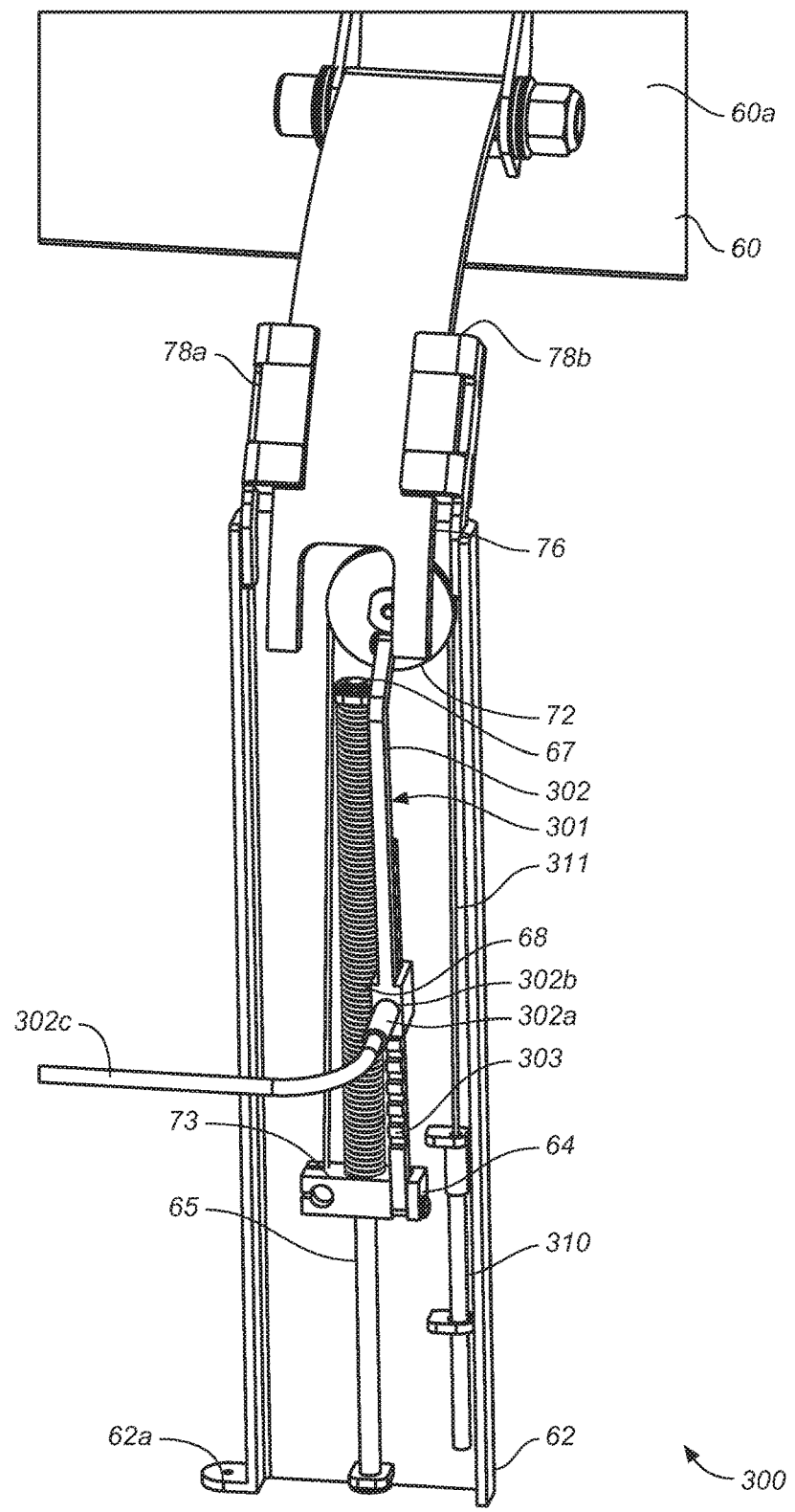
FIG. 8 is a rear perspective view of an alternative embodiment of the adjustment mechanism of the headrest assembly.
Figure 9:
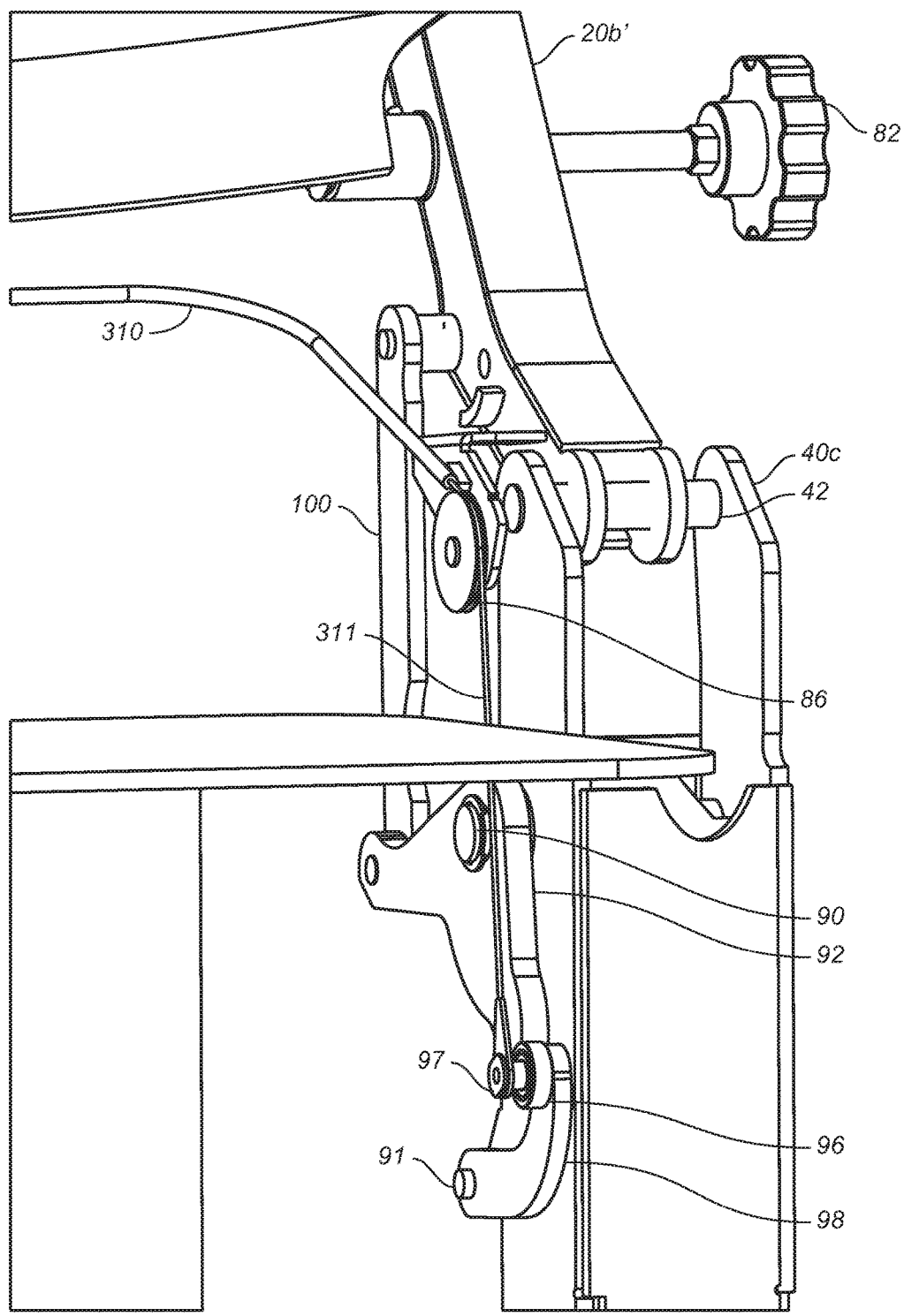
FIG. 9 is a detailed left rear perspective view of the adjustment mechanism for the assembly of FIG. 8.

Looking now at FIGS. 8-9, there is shown an alternative embodiment 300 of a headrest assembly for an ergonomic chair and its corresponding adjustment mechanism. It will be appreciated that this view mirrors that of the apparatus of FIGS. 3-4, with structural and operational alternatives featured, as described herein. In this instance, adjustment of the headrest assembly is accomplished using an adjustable length link 301, comprising a sliding beam having an upper linear rack 302 and a lower linear rack 303. The upper linear rack is connected at its upper end to the arc-shaped guide bar 76, and at its lower end to a spring-loaded pull pin 302a and pull pin flex cable 302b. The sliding beam is slidingly disposed through the pull pin 302a and brought into sliding engagement with a lower linear rack 303, the rack being a linear ratchet having teeth. The lower linear rack is connected at its lower end to slide block 64. The lower linear rack and upper linear rack may be selectively moved relative to one another by disengaging the pull pin from the lower linear rack by pulling on a pull handle (not shown but well known in the art) disposed on the chair frame, the pull handle being coupled to a cable slidingly disposed through cable sheath 302c. In this manner the vertical position of the arc-shaped guide bar 76 and head rest plate 60a may be adjusted to fit the user's preferences.

As in the earlier described embodiment, a helical compression spring 68 is disposed over the spring post 65 and under an upper stop 67. The spring urges the slide block 64 downward, along with the flexible headrest drive cable 311 attached at its terminal end 73 to the slide block 64. The headrest drive cable 311 issues from the cable sheath 310 proximate its upper end. The flexible headrest drive cable 311 and cable sheath 310 are anchored to the headrest frame 62, and the drive cable 311 loops over the top of the headrest pulley 72 to terminate at the connection 73 on the slide block 64. Tension in the flexible headrest drive cable 311 (with corresponding compression in the cable sheath 310) urges the slide block 64, adjustable link 301, and arc-shaped guide bar 76) upward, thus also urging upward the head restraint (or head rest plate) 60a pivotally coupled to the guide bar 76.

Now referring specifically to FIG. 9, a first vertical adjustment spindle 82 only is now shown rotatably disposed in frame 20b in a location convenient for the user to rotate manually while seated. A first pulley is pivotally attached to frame 20b and positioned slightly above the seat base assembly 40. Drive cable 311 terminates at an upper pivot point 97 and extends through the cable sheath 310 to the slide block 64, as described in the immediately preceding paragraph. As before, cam 92 is pivotally attached to the vertical post 40c at a cam pivot 90. Cam follower arm 98 is pivotally attached to the vertical post 40c at a lower pivot point 91. Then cam follower roller 96 are pivotally attached to the upper end of cam follower arm 98 at an upper pivot point 97.

The above disclosure is sufficient to enable one of ordinary skill in the art to practice the invention, and provides the best mode of practicing the invention presently contemplated by the inventor. While there is provided herein a full and complete disclosure of embodiments of this invention, it is not desired to limit the invention to the exact construction, dimensional relationships, and operation shown and described. Various modifications, alternative constructions, changes and equivalents will readily occur to those skilled in the art and may be employed, as suitable, without departing from the true spirit and scope of the invention. Such changes might involve alternative materials, components, structural arrangements, sizes, shapes, forms, functions, operational features or the like.

Therefore, the above description and illustrations should not be construed as limiting the scope of the technology disclosed herein.

What is claimed as invention is:

1. A chair, comprising:
   a seat base;
   a seat back rotatable in relation to said seat base;
   a head rest assembly slidably mounted to said seat back, said headrest assembly including a head restraint mounted atop an arcuate and slidable guide bar, said guide bar slidably movable in an arc having a center of rotation that may be adjusted vertically in relation to said seat back by a user;
   wherein slidable movement of said guide bar is actuated by a flexible cable drive rotating said head restraint forward and upward on at least one slide and a spring that urges said head restraint downward and rearward toward a backside of said seat back.

2. The chair of claim 1, wherein guide bar moves either forward or rearward in relation to said seat back as said seat back is tilted rearward and either forward or rearward as said seat back is tilted rearward.

3. A chair, comprising:
   a base assembly including a floor base, seat bottom, and vertical structure;
   a seat back frame pivotally attached to said base assembly;
   a headrest frame attached to said seat back frame;
   an arc-shaped guide bar slideably disposed in said headrest frame; and
   a head rest plate pivotally affixed to said arc-shaped guide bar;
   wherein said headrest frame, said arc-shaped guide bar and said head rest plate operate as an assembly which can be vertically adjusted.

4. The chair of claim 3, wherein said arc-shaped guide bar is driven forward and up by a flexible cable and driven down and back by a spring and/or the weight of a user's head.

5. The chair of claim 3, further comprising a cam plate and cam follower pivotally attached to said floor base assembly.

6. The chair of claim 5, wherein said cam plate is driven by a linkage between said seat back frame and said cam plate.

7. The chair of claim 6, wherein said cam follower is driven by said cam plate.

8. The chair of claim 3, further including a pulley on said cam follower around which a flexible cable passes; and a spindle attached to said seat back frame at which said flexible cable terminates.

9. The chair of claim 8, wherein said spindle is rotatable so as to pull said flexible cable and adjust locations of said arc-shaped guide bar.

10. The chair of claim 3, further including a flexible cable and spindle disposed on said seat back frame, wherein said flexible cable operatively couples said spindle to said head rest plate such that said head rest plate is vertically adjustable.

11. An ergonomic chair and auto-adjusting headrest assembly, comprising:
    a seat base;
    a seat back pivotally mounted to said seat base;
    an arc-shaped headrest assembly frame mounted on said seat back, said headrest assembly frame having slides;
    an arc-shaped guide bar slideably disposed in said slides;
    a headrest plate pivotally mounted to an upper end of said guide bar;
    wherein said guide bar moves in a generally arc-shaped motion in said slides as said seat back is tilted rearward from an upright to a generally reclined position or upward from a generally reclined to a generally upright position.

12. The ergonomic chair of claim 11, wherein said arc-shaped guide bar has a center of curvature that may be adjustably positioned in relation to said seat back.

13. The ergonomic chair of claim 11, further including drive apparatus operatively coupled to said headrest assembly frame so as to move said arc-shaped guide bar and said headrest plate forward and rearward.

14. The ergonomic chair of claim 13, wherein said drive apparatus comprises a flexible cable drive that moves said guide bar upward in an arc in said slides, and a spring retracts said guide bar downward in an arc as said seat back is moved or when said headrest plate is adjusted downwardly.

15. The ergonomic chair of claim 14, further including at least one cam to actuate movement of said flexible cable, wherein cam movement is actuated by said seat back as it rotates relative to said seat base.

16. The ergonomic chair of claim 15, wherein said flexible cable terminates at a spindle that can be manually rotated by the chair user to fine tune the position of said headrest plate.

17. The ergonomic chair of claim 16, wherein said headrest plate moves in an arc on said guide bar, and further wherein as said seat back rotates relative to said seat base, the orientation of the arc is defined by the shape of said at least one cam.

\* \* \* \* \*